US008594466B2

(12) United States Patent
Tsuda et al.

(10) Patent No.: US 8,594,466 B2
(45) Date of Patent: Nov. 26, 2013

(54) IMAGE DATA CONVERTING DEVICE, METHOD FOR CONVERTING IMAGE DATA, PROGRAM AND STORAGE MEDIUM

(75) Inventors: Takuya Tsuda, Osaka (JP); Tomohiro Morita, Osaka (JP); Yasumasa Yajima, Yokohama (JP)

(73) Assignee: Sharp Kabushiki Kaisha, Osaka (JP)

( * ) Notice: Subject to any disclaimer, the term of this patent is extended or adjusted under 35 U.S.C. 154(b) by 214 days.

(21) Appl. No.: 12/998,576

(22) PCT Filed: Oct. 14, 2009

(86) PCT No.: PCT/JP2009/067790

§ 371 (c)(1), (2), (4) Date: May 5, 2011

(87) PCT Pub. No.: WO2010/055743

PCT Pub. Date: May 20, 2010

(65) Prior Publication Data

US 2011/0206297 A1 Aug. 25, 2011

(30) Foreign Application Priority Data

Nov. 11, 2008 (JP) .................................. 2008288898

(51) Int. Cl.
*G06K 9/32* (2006.01)

(52) U.S. Cl.
USPC ............ 382/300; 382/274; 382/299; 358/1.2; 358/525

(58) Field of Classification Search
USPC .................... 382/274, 299, 300; 358/1.2, 525
See application file for complete search history.

(56) References Cited

U.S. PATENT DOCUMENTS

| | | | | |
|---|---|---|---|---|
| 5,495,296 | A * | 2/1996 | Dosho et al. | 348/571 |
| 6,393,144 | B2 * | 5/2002 | Rogina et al. | 382/154 |
| 6,731,800 | B1 * | 5/2004 | Barthel et al. | 382/176 |
| 6,870,532 | B2 * | 3/2005 | Travers et al. | 345/419 |
| 6,919,892 | B1 * | 7/2005 | Cheiky et al. | 345/473 |
| 6,970,257 | B2 * | 11/2005 | Endo et al. | 358/1.1 |

(Continued)

FOREIGN PATENT DOCUMENTS

| | | | |
|---|---|---|---|
| JP | 2002351424 | A | 12/2002 |
| JP | 2003271088 | A | 9/2003 |
| JP | 2004094247 | A | 3/2004 |

*Primary Examiner* — Yosef Kassa

(74) *Attorney, Agent, or Firm* — Harness, Dickey & Pierce, PLC

(57) ABSTRACT

An image data converting device of at least one embodiment of the present invention for converting, by linear interpolation, input image data having a predetermined resolution into delta arrangement image data having a resolution that is smaller than the predetermined resolution, the image data converting device includes: an even line pixel value converting section for converting a value of each pixel in each even line in the input image data into a value of each pixel in each even line in the delta arrangement image data, by using a predetermined initial value for even lines; and an odd line pixel value converting section for converting a value of each pixel in each odd line in the input image data into a value of each pixel in each odd line in the delta arrangement image data, by using a predetermined initial value for odd lines, the predetermined initial value for odd lines being $(1\pm\alpha)/2$ $(0\leq\alpha\leq0.5)$ of the initial value for the even lines. This allows conversion into an image that looks natural by controlling a jaggy and/or colored appearance of a contour section of the image, when image data having a high resolution is converted into the delta arrangement image data having a low resolution.

1 Claim, 9 Drawing Sheets

(56) References Cited

U.S. PATENT DOCUMENTS

| | | | | |
|---|---|---|---|---|
| 6,996,272 | B2 * | 2/2006 | Chen et al. | 382/173 |
| 7,102,687 | B2 * | 9/2006 | Nakamoto et al. | 348/446 |
| 7,792,352 | B2 * | 9/2010 | Sakai et al. | 382/149 |
| 2002/0180745 | A1 | 12/2002 | Matsuda et al. | |
| 2003/0174151 | A1 | 9/2003 | Awamoto et al. | |
| 2004/0113922 | A1 | 6/2004 | Choe et al. | |

* cited by examiner (a)

(b)

(a)

(b)

IMAGE DATA CONVERTING DEVICE, METHOD FOR CONVERTING IMAGE DATA, PROGRAM AND STORAGE MEDIUM

TECHNICAL FIELD

The present invention relates to an image data converting device. More specifically, the present invention relates to an image data converting device, a method for converting image data, a program and a storage medium, each of which is for converting image data in accordance with a resolution of a display panel.

BACKGROUND ART

Some conventional liquid crystal drivers for digital still cameras (hereinafter, referred to as DSCs) have a resolution converting function for converting a resolution of a YUV format input image data in accordance with a resolution of a display panel for output. In general, converting a resolution in accordance with a resolution of a display panel for output is called scaling.

In scaling, for example, a high-resolution input image data is converted into a low-resolution input image data. The following explains a liquid crystal driver that has the function described above and is used in a conventional compact display, with reference to FIGS. 8 to 10.

(Overview of Conventional Resolution Conversion)

First, the following explains an overview of a conventional resolution conversion, with reference to FIG. 8. FIG. 8 is a schematic diagram illustrating a process for converting input-image image data (hereinafter, referred to as input image data 1) whose pixels are in a stripe arrangement and whose resolution is 720 pixels into image data (hereinafter, referred to as delta arrangement image data 2) whose pixels are in a delta arrangement and whose resolution is 320 pixels. (*a*) of FIG. 8 schematically illustrates a process for converting the input image data 1 into an odd line data 2*a* of the delta arrangement image data 2. Meanwhile, (*b*) of FIG. 8 schematically illustrates a process for converting the input image data 1 into an even line data 2*a* of the delta arrangement image data 2.

Each of (*a*) and (*b*) of FIG. 8 shows a scale 10 or 11 below the input image data 1. The scale 10 is a scale for the input image data 1, that is, a scale having 720 equal divisions of pixels. The scale 11 is a scale for the arrangement image data 2, that is, a scale having 320 equal divisions of pixels. The scale 11 is shown so as to correspond to the scale 10. Regions of the odd line data 2*a* and the even line data 2*b* each of which regions is surrounded by a dotted line corresponds to a display area 31 of a display for output.

In the odd line data 2*a* shown in (*a*) of FIG. 8, an ellipse 4 indicates pixel data for each one pixel made of sub-pixels of RGB. A scaling ratio used in an example of the present resolution conversion is a ratio of the resolution (720 pixels) of the input image data 1 to the resolution (320 pixels) of the delta arrangement image data 2. Accordingly, the scaling ratio is 2.25. Therefore, a length of data for one pixel in the odd line data 2*a* corresponds to 2.25 divisions on the scale 10.

Similarly, in the even line data 2*b* shown in (*b*) of FIG. 8, an ellipse 6 indicates pixel data for each one pixel made of sub-pixels of RGB. As described above, the scaling ratio is 2.25. Therefore, a length of data for one pixel in the even line data 2*b* corresponds to 2.25 divisions on the scale 10.

The present resolution conversion is based on linear interpolation. An image data conversion formula used in the liner interpolation requires a predetermined initial value. Initial values used for conversion into the odd line data 2*a* and the even line data 2*b* may simply be set as follows. That is, the initial value used for conversion into the even line data 2*b* in (*b*) of FIG. 8 may be set to 2.25 and the initial value used for conversion into the odd line data 2*a* in (*a*) of FIG. 8 may be set to 2.75 dots which is shifted by 0.5 dot from the initial value used for the conversion into the even line data 2*b*, in view of the delta arrangement. Here, for convenience of the explanation, the initial value is set to a value obtained by subtracting 1 from each of the above initial values. In other words, the initial value used for conversion into the odd line data 2*a* in (*a*) of FIG. 8 is set to 1.75 dots and the initial value used for conversion into the even line data 2*b* in (*b*) of FIG. 8 is set to 1.25 dots.

(Conversion of Odd Line)

First, the conversion into the odd line data 2*a* is explained with reference to (*a*) of FIG. 8. Conventionally, image data is converted by linear interpolation as follows.

As shown in (*a*) of FIG. 8, in the conversion into the odd line data 2*a*, the initial value 1.75 as described above is used. For example, in a case where an R pixel value is converted, a pixel value of r0 of a first pixel provided at a starting position of the odd line data 2*a* is obtained as follows. Because the initial value used in this case is 1.75, an R pixel corresponding to the initial value in the input image data 1 is a pixel R1. As an arrow 5 indicates, with reference to pixel values of R1 and R2 that is disposed adjacent to R1 on a right side of R1, conversion into r0 is performed. More specifically, a value of r0 is obtained by substituting the pixel values of R1 and R2 into an expression: $r0=R1\times(1-0.75)+R2\times0.75$.

Then, a pixel value of r1 of a second pixel in the odd line data 2*a* is obtained as follows. Because the scaling ratio is 2.25 as described above, a next R pixel to be referred to in the input image data 1 is a pixel corresponding to a position of a value obtained by adding 2.25 to 1.75 dots. That is, as indicated by an arrow 5, with reference to a pixel R4 corresponding to a position of 4 on the scale 10, conversion into r1 in the odd line data 2*a* is performed. Here, a reference position is 4.00 dot and there is no fractional figure after the decimal point. Accordingly, in this case, with reference to only a pixel value of R4, the conversion is carried out. In other words, r1 is obtained from an expression $r1=R4$.

Each pixel value is obtained according to the method described above until a value of the last R pixel in the odd line data 2*a*, that is, r319 is obtained. The same applies to calculation of pixel values of g and b constituting each one pixel of the odd line data 2*a*.

(Conversion of Even Line)

Next, the conversion into the even line data 2*b* is explained with reference to (*b*) of FIG. 8. Basically, a method for the conversion into the even line data 2*b* is the same as that into the odd line data 2*a* as described above.

For example, in a case where an R pixel value is converted, a pixel value of r1 of a first pixel provided at a starting position of the even line data 2*b* is obtained as follows. Because the initial value used in this case is 1.25, an R pixel corresponding to the initial value in the input image data 1 is a pixel R1. As an arrow 7 indicates, with reference to pixel values of R1 and R2 that is disposed adjacent to R1 on a right side of R1, conversion into r1 is performed. More specifically, a value of r1 is obtained by substituting the pixel values of R1 and R2 into an expression: $r1=R1\times(1-0.25)+R2\times0.25$.

Because the scaling ratio is 2.25 as described above, a next R pixel to be referred to in the input image data 1 is a pixel corresponding to a position of a value obtained by adding 2.25 to 1.25 dots. That is, as indicated by an arrow 7, with reference to a pixel R3 corresponding to a position 3.5 on the scale 10, conversion into r2 in the even line data 2*b* is performed. More specifically, a value r2 is obtained by substituting pixel values of R3 and R4 into an expression: r2=R3×(1−0.5)+R4×0.5.

Each pixel value is obtained according to the method described above until a value of the last R pixel in the even line data 2*b*, that is, r320 is obtained. The same applies to calculation of pixel values of g and b constituting each one pixel of the even line data 2*b*. In this way, the resolution converting function of a conventional liquid crystal driver converts the input image data 1 whose pixels are in a stripe arrangement and whose resolution is 720 pixels into the delta arrangement image data 2 whose pixels are in a delta arrangement and whose resolution is 320 pixels.

Next, with reference to FIGS. 9 and 10, the following explains in more detail an arrangement of pixels of image data that is to be converted by the resolution converting function of the conventional liquid crystal driver as described above with reference to FIG. 8. This clarifies a problem of resolution conversion carried out by the conventional liquid crystal driver. First, with reference to FIG. 9, the following explains downsampling.

(Downsampling)

FIG. 9 is a diagram illustrating sampling positions in odd line data and even line data in downsampling in a stripe arrangement, in a case where image data whose resolution is 720 pixels in a stripe arrangement is converted into image data whose resolution is 320 pixels in a delta arrangement. Here, the sampling means to make a reference to a value of pixel data.

As shown in FIG. 9, in stripe arrangement image data 100, pixels S1 to S5 are aligned in the first line (hereinafter, referred to as odd data) and pixels S1' to S5' are aligned in the second line (hereinafter, referred to as even data). Scales 101 and 102 shown below the stripe arrangement image data 100 correspond to the first line data and the second line data, respectively. The scales 101 and 102 have numerical values each indicating a starting position of sampling of pixel data in each line.

As shown in the scale 101, an initial value used in sampling of the odd data, that is, the first sampling position is arranged to be 1.75 dots.

A pixel arrangement after the resolution conversion becomes a delta arrangement in which odd data and even data are provided alternately in a vertical direction. Accordingly, regarding pixel units, pixels in the even data is disposed so as to be shifted by 0.5 dot to the left from the pixels in the odd data. Therefore, the initial value used in the sampling of the even data is 1.25 that is obtained by shifting by 0.5 dot the above initial value, in consideration that the arrangement of the pixels after the resolution conversion is a delta arrangement.

Because the resolution conversion is a conversion from the resolution of 720 pixels to the resolution of the resolution of 20 pixels, the scaling ratio is 2.25. Accordingly, on the scale 101, 4 dots is indicated. The "4 dots" is a position of the next sampling which position is obtained by adding 2.25 to the initial value 1.75 in the odd data.

Meanwhile, on the scale 102, 3.5 dots is indicated. The "3.5 dots" is a position of the next sampling which position is obtained by adding 2.25 to the initial value 1.25 in the even data.

According to the above sampling position, a starting position of the first sampling data in the odd data is 1.75 dots. Meanwhile, a starting position of the first sampling data in the even data is 1.25 dots. Further, a starting position of the second sampling data in the odd data is 4 dots. Meanwhile, a starting position of the second sampling data in the even data is 3.5 dots.

Accordingly, with respect to the staring position of the first sampling data in the odd data as a reference position, the starting position of the first sampling data in the even data is shifted by 0.5 dot to the left and the starting position of the second sampling data in the even data is shifted by 1.75 dots to the right.

(Image Data after Conversion)

Next, the following explains an overview of image data after the resolution conversion, with reference to FIG. 10. FIG. 10 is a diagram showing respective positions of RGB pixels in a delta arrangement after conversion of the image data whose resolution is 720 pixels in a stripe arrangement into the image data whose resolution is 320 pixels in the delta arrangement. (*a*) of FIG. 10 shows a position of G pixel data in the delta arrangement; (*b*) of FIG. 10 shows a position of B pixel data in the delta arrangement; and (*c*) of FIG. 10 shows a position of R pixel data in the delta arrangement.

As shown in (*a*) of FIG. 10, in odd data 110, the first G data is D2, and the second G data is D5. Meanwhile, in even data 111, the first G data is D1' and the second G data is D4'. Scales 112 and 113 correspond to the odd data 110 and the even data 111, respectively. Each numerical value on the scales 112 and 113 indicates a center position of each pixel data in the odd data 110 or the even data 111. Here, with respect to D2 of the odd data 110 as a reference, D1' of the even data 111 is shifted by 0.5 pixel to the left and D4' is shifted by 0.5 pixel to the right.

With reference to (*b*) of FIG. 10, in the odd data 110, the first B data is D3 and the second B data is D6. Meanwhile, in the even data 111, the first B data is D2' and the second B data is D5'. Scales 114 and 115 correspond to the odd data 110 and the even data 111, respectively. Each numerical value on the scales 114 and 115 indicates a center position of each pixel data in the odd data 110 or the even data 111. Here, with respect to D3 of the odd data 110 as a reference, D2' of the even data 111 is shifted by 0.5 pixel to the left and D5' is shifted by 0.5 pixel to the right.

Further, with reference to (*c*) of FIG. 10, in the odd data 110, the first R data is D1 and the second R data is D4. Meanwhile; in the even data 111, the first R data is D3' and the second R data is D6'. Scales 116 and 117 correspond to the odd data 110 and the even data 111, respectively. Each numerical value on the scales 116 and 117 indicates a center position of each pixel data in the odd data 110 or the even data 111. Here, with respect to D1 of the odd data 110 as a reference, D3' of the even data 111 is shifted by 0.5 pixel to the right and D6' is shifted by 1.5 pixels to the right.

(Problems in Conventional Resolution Conversion)

As described above, in each of G and B data after the resolution conversion, a shift amount between reference pixel data in the odd data 110 and a pixel in the even data 111 corresponding to the reference pixel data is equal to a shift amount between the reference pixel data in the odd data 110 and a pixel in the even data 111 which pixel is a succeeding pixel of the pixel data in the even data 111 corresponding to the reference pixel data. However, in R data, such shift amounts are not equal. Such uneven shifts cause a display position of each pixel data of a converted image to be misaligned from a display position of each pixel data of an unconverted image. Accordingly, the resolution conversion carried out by the conventional liquid crystal driver may cause a contour section of the converted image to appear jaggy and/or colored (falsely colored). This significantly deteriorates an image quality. Meanwhile, Patent Literature 1 discloses a technique for converting a resolution of an image by a method other than the above-described liner interpolation.

According to the technique of Patent Literature 1, specifically, first, a scaling filter is constructed for resolution adjustment between an input video image of inputted video image signals and an output display device, in the output display device including sub-pixels which output display device has pixels in a delta arrangement. Next, a representing value of sub-pixel values of pixels to be processed by the scaling filter is obtained, and sub-pixel values is obtained in consideration of a difference between the pixels of the input video image. Subsequently, gamma correction suitable for the display device that is to display the sub-pixel values is carried out and the sub-pixel values are displayed by the display device.

The technique of Patent Literature 1 reduces a color fringe that occurs on a boundary of vide images, by a sub-pixel rendering method as described above.

The technique of Patent Literature 1 is a technique of a wide range covering not only scaling but also a process procedure of image processing such as gamma correction. Further, the technique of Patent Literature 1 requires a display that includes a processor that has a fairly high operation processing capability and the process is complicated.

Though an algorithm that is more advantageous for an image quality can be selected for scaling in an environment where a more sophisticated operation processing can be performed, the technique of Patent Literature 1 cannot be applied to a compact display that does not include such a processor as described above.

CITATION LIST

Patent Literature

Patent Literature 1
Japanese Patent Application Publication, Tokukai, No. 2004-94247 (published on Mar. 25, 2004)

SUMMARY OF INVENTION

Technical Problem

As described above, in resolution conversion carried out by use of a conventional liquid crystal driver, a contour section of a converted image may look jaggy and/or colored (falsely colored). This causes a problem of a significant deterioration of an image quality. Further, a resolution conversion technique directed to a compact display that does not include a processor that has a sophisticated operation processing capability has not yet been known.

The present invention is attained in view of the above problem. An object of the present invention is to provide an image data converting device, a method for converting image data, a program and a storage medium, each of which makes it possible to avoid misalignment of a position of each pixel data caused by resolution conversion and to perform conversion into an image that appears natural under control of a jaggy and/or color appearance of a contour section of an image.

Solution to Problem (Image Data Converting Device)

In order to solve the problems mentioned above, an image data converting device of the present invention for converting, by linear interpolation, input image data having a predetermined resolution into delta arrangement image data having a resolution that is smaller than the predetermined resolution, the image data converting device includes: an even line pixel value converting section for converting a value of each pixel in each even line in the input image data into a value of each pixel in each even line in the delta arrangement image data, by using a predetermined initial value for even lines; and an odd line pixel value converting section for converting a value of each pixel in each odd line in the input image data into a value of each pixel in each odd line in the delta arrangement image data, by using a predetermined initial value for odd lines, the predetermined initial value for odd lines being $(1\pm\alpha)/2$ $(0\leq\alpha\leq0.5)$ of the initial value for the even lines.

According to the above configuration, the image data converting device converts, by linear interpolation, input image data having a predetermined resolution into delta arrangement image data having a resolution that is lower than the predetermined resolution. This makes it possible to convert, by linear interpolation, image data having a high resolution into image data that can be displayed on a delta arrangement panel having a low resolution.

Further, the image data converting device includes: an even line pixel value converting section for converting a value of each pixel in each even line in the input image data into a value of each pixel in each even line in the delta arrangement image data, by using a predetermined initial value for even lines; and an odd line pixel value converting section for converting a value of each pixel in each odd line in the input image data into a value of each pixel in each odd line in the delta arrangement image data, by using a predetermined initial value for odd lines, the predetermined initial value for odd lines being $(1\pm\alpha)/2(0\leq\alpha0.5)$ of the initial value for the even lines.

According to the above arrangement, the initial value for odd lines is arranged to be $(1\pm\alpha)/2(0\leq\alpha\leq0.5)$ that is the initial value for even lines, and odd line data and even line data of input image data are separately converted. As a result, a relative positional relation of respective pixel data in input image data can be kept so that a relative positional relation of respective pixel data within converted image data does not largely change from the relative positional relation of the respective pixel data in the input image data. Therefore, the image data converting device of the present invention reduces or avoids misalignment of a position of image data, which has conventionally been a problem. Thereby, the image data converting device of the present invention performs conversion into an image that looks natural as a result of suppression of a jaggy and/or colored appearance of a contour section of the image.

(Method for Converting Image Data)

In order to solve the problems mentioned above, a method of the present invention for converting image data, the method converting, by linear interpolation, input image data having a predetermined resolution into delta arrangement image data having a resolution that is smaller than the predetermined resolution, the method comprising the steps of: converting a value of each pixel in each even line in the input image data into a value of each pixel in each even line in the delta arrangement image data, by using a predetermined initial value for even lines; and converting a value of each pixel in each even line in the input image data into a value of each pixel in each odd line in the delta arrangement image data, by using a predetermined initial value for odd lines, the predetermined initial value for odd lines being $(1\pm\alpha)/2(0\leq\alpha0.5)$ of the initial value for the even lines.

The above configuration provides the same effects as the image data converting device described above.

(Optimum Initial Value)

Further, in the data converting device of the present invention, preferably, the initial value for the odd lines is half the initial value for the even lines.

According to the above configuration, the initial value for odd lines is twice the initial value for even lines. This initial value is an optimum initial value in consideration of a condition such that a position of the odd line data is shifted by 0.5 pixel from a position of the even line data in a delta arrangement. This makes it possible to perfectly avoid misalignment of a position of pixel data and to suppress a jaggy and/or colored appearance of a contour section of the image.

(Program and Storage Medium)

Note that the image data converting device of the present invention may be realized by a computer. In this case, the present invention encompasses a program for realizing an input detection device by means of a computer by causing the computer to function as each of the above means and a computer-readable storage medium storing the program.

Advantageous Effects of Invention

As described above, when odd line data and even line data of input image data are to be separately converted, the image data converting device of the present invention uses an optimum initial value for each conversion of the odd line data and even line data so that a relative positional relation of pixel data within converted image data can be kept to be the same as a relative positional relation of pixel data within input image data. This makes it possible to reduce or avoid misalignment of a position of the image data. Therefore, the image data converting device of the present invention can perform conversion into an image that looks natural as a result of suppression of a jaggy and/or colored appearance of a contour section of the image.

BRIEF DESCRIPTION OF DRAWINGS

FIG. 1 is a schematic diagram illustrating a process in which an image data conversion device of the present invention converts, by linear interpolation, image data of an input image whose pixels are in a stripe arrangement and whose resolution is 720 pixels into image data whose pixels are in a delta arrangement and whose resolution is 320 pixels.

FIG. 2 is a block diagram illustrating a configuration of an essential part of a liquid crystal driver.

FIG. 3 is a schematic diagram showing a delta arrangement panel (960 dots×240 lines).

FIG. 4 is a diagram showing sampling positions of odd line data and even line data in downsampling in a stripe arrangement in a case where image data whose pixels are in a stripe arrangement and whose resolution is 720 pixels is converted into image data whose pixels are in a delta arrangement and whose resolution is 320 pixels.

FIG. 5 is a diagram showing respective positions of RGB pixel in a delta arrangement after conversion of image data whose pixels are in a stripe arrangement and whose resolution is 720 pixels into image data whose pixels are in a delta arrangement and whose resolution is 320 pixels.

FIG. 6 is a diagram showing (i) image data obtained as a result of converting image data by a conventional resolution conversion function and (ii) image data obtained as a result of converting, by an image data converting section of the present invention, image data that is the same as the image data converted by the conventional resolution conversion function.

FIG. 7 is a diagram showing (i) image data obtained as a result of converting image data by a conventional resolution conversion function and (ii) image data obtained as a result of converting, by an image data converting section of the present invention, image data that is the same as the image data converted by the conventional resolution conversion function.

FIG. 8 is a schematic diagram illustrating a process in which a conventional liquid crystal driver converts, by linear interpolation, image data of an input image whose pixels are in a stripe arrangement and whose resolution is 720 pixels into image data whose pixels are in a delta arrangement and whose resolution is 320 pixels.

FIG. 9 is a diagram showing sampling positions in odd line data and even line data in downsampling in a stripe arrangement in a case where image data whose pixels are in a stripe arrangement and whose resolution is 720 pixels is converted into image data whose pixels are in a delta arrangement and whose resolution is 320 pixels.

FIG. 10 is a diagram showing respective positions of RGB pixels on a delta arrangement after conversion of image data whose pixels are in a stripe arrangement and whose resolution is 720 pixels into image data whose pixels are in a delta arrangement and whose resolution is 320 pixels.

DESCRIPTION OF EMBODIMENTS

The following explains an embodiment of an image data converting device according to the present invention, with reference to FIGS. 1 to 7.

(Placement of Image Data Converting Device)

Figure 2:
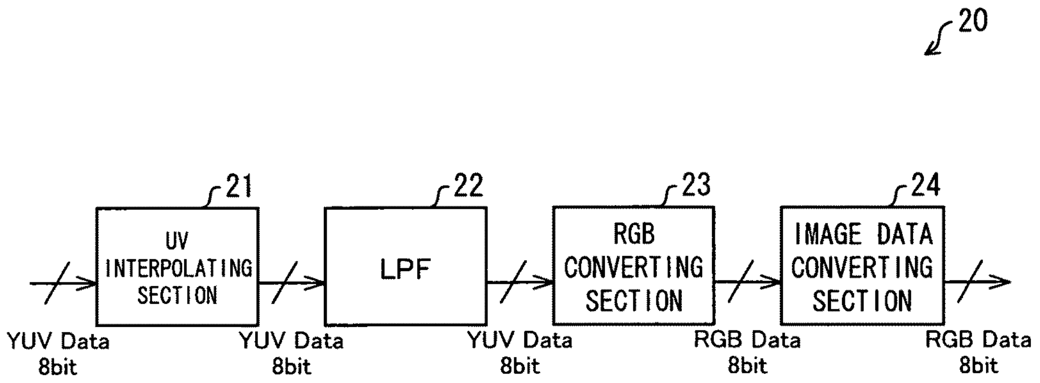
FIG. 2

First, the following explains where an image data converting device of the present invention is provided in hardware, with reference to FIG. 2. FIG. 2 is a block diagram illustrating a configuration of an essential part of a liquid crystal driver 20. The liquid crystal driver 20 here means, for example, a liquid crystal driver used in a DSC.

First, with reference to FIG. 2, a configuration of the liquid crystal driver 20 is explained. As shown in FIG. 2, the liquid crystal driver 20 includes a UV interpolating section 21, an LPF (Low Pass Filter) 22, an RGB converting section 23, and an image data converting section 24 (an image data converting device). In this way, the image data converting device of the present invention is a device for further converting, in accordance with a resolution of a display panel for output, RGB signals which has been obtained by conversion of YUV signal image data in advance.

Next, the following briefly explains a process flow in the liquid crystal driver 20 up to a point at which YUV format input signals have been converted by the image data converting section 24. In the present resolution conversion, 8-bit YUV data signals (720 pixels) that complies with ITU-R BT. 601 standard is to be converted into 8-bit RGB image data (320 pixels) in a delta arrangement. Note that in the present invention, a set of "RGB" as a group is expressed as a pixel and respective pixels of "R", "G", and "G" are expressed as dots.

First, when 8-bit YUV data is inputted, the UV interpolating section 21 carries out interpolation only on UV data with respect to input data sampled, so that a proportion of Y:U:V becomes 4:2:2. As a result, data whose proportion ofY:U:V is 4:4:4 is produced.

The 8-bit YUV data generated by the UV interpolating section 21 is inputted into LPF 22 and only low-frequency component is outputted to the RGB converting section 23.

The RGB converting section 23 converts the 8-bit YUV data into 8-bit RGB data, according to a conversion formula defined in ITU-R BT. 601 standard. Then, the RGB converting section 23 outputs the 8-bit RGB data obtained by the conversion, to the image data converting section 24.

Figure 3:
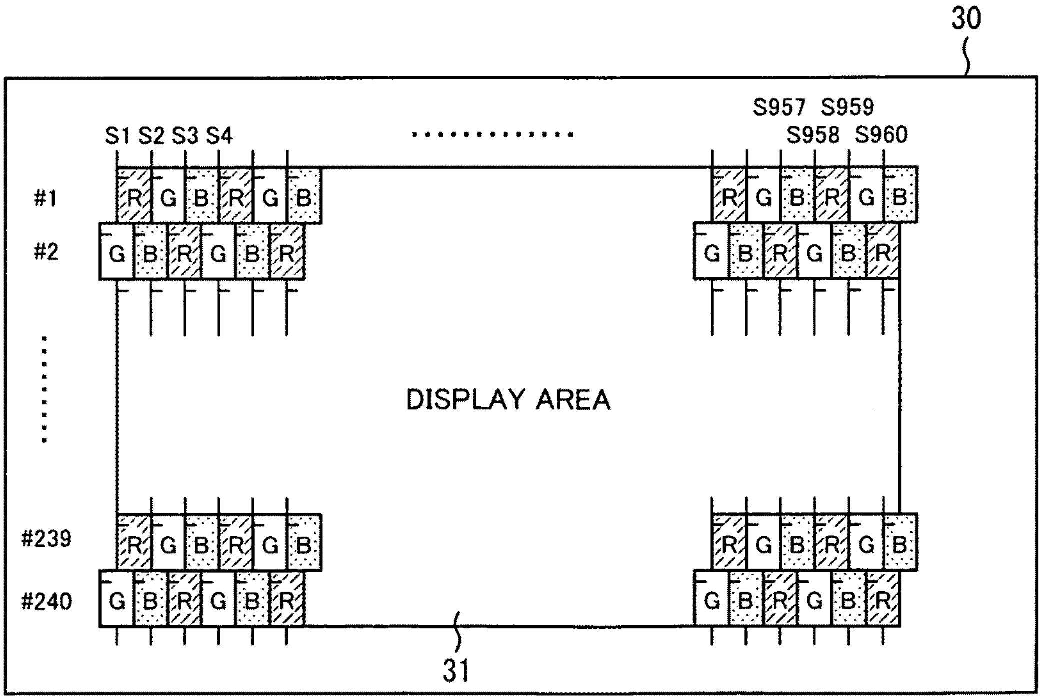
FIG. 3

The image data converting section 24 converts, by linear interpolation, the inputted 8-bit RGB data whose resolution is 720 pixels into 8-bit RGB data whose resolution is 320 pixels. Thus converted 8-bit RGB data is data that can be outputted to a delta arrangement panel 30 (960 dots×240 lines) as shown in FIG. 3. As shown in FIG. 3, in the delta arrangement panel, a position of an alignment of pixels of Odd Line (i.e., odd line: 1st line, 3rd line, etc.) is shifted by ½ pixel in a horizontal direction from a position of an alignment of pixels of Even line (i.e., even line: 2nd line, 4th line, etc.). Therefore, the image data converting section 24 is required to perform conversion into image data that can be outputted to such a delta arrangement panel 30. The following explains in detail processing carried out by the image data converting section 24.

Note that the data that can be processed according to the present invention is not limited to data for the delta arrangement shown in FIG. 3. The same effect as in the case of FIG. 3 can be obtained by processing carried out according to the present invention, for example, in data having an arrangement in which positions of the Odd Line and the Even Line are switched in the delta arrangement as shown in FIG. 3 and in data having an arrangement in which RGB are switched one another.

(Overview of Resolution Conversion)

Figure 1:
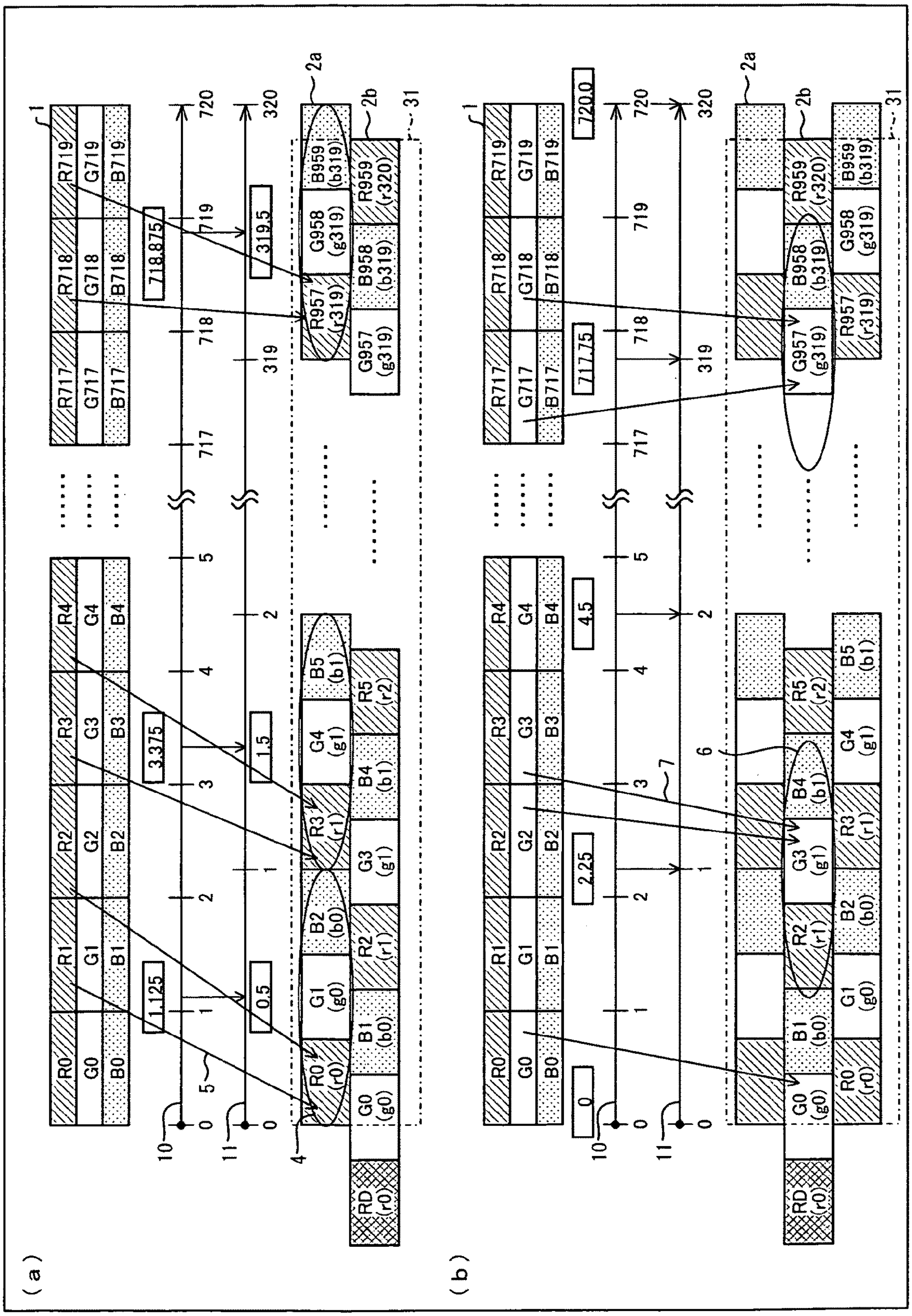
FIG. 1

First, the following explains an overview of resolution conversion in the image data converting device according to the present invention, with reference to FIG. 1. FIG. 1 is a schematic diagram illustrating a process in which an image data conversion device of the present invention converts image data (hereinafter, referred to as input image data) of an input image whose pixels are in a stripe arrangement and whose resolution is 720 pixels into image data (hereinafter, referred to as delta arrangement image data) whose pixels are in a delta arrangement and whose resolution is 320 pixels. (*a*) of FIG. 1 briefly shows a process for converting input image data 1 into odd line data 2*a* of delta arrangement image data 2. Meanwhile, (*b*) of FIG. 1 briefly shows a process for converting the input image data 1 into even line data 2*b* of the delta arrangement image data 2.

Each of (*a*) and (*b*) of FIG. 1 shows a scale 10 or 11 below the input image data 1. The scale 10 is a scale for the input image data 1, that is, a scale having 720 equal divisions of pixels. The scale 11 is a scale for the input image data 2, that is, a scale having 320 equal divisions of pixels. The scale 11 is shown so as to correspond to the scale 10. Regions of the odd line data 2*a* and the even line data 2*b* each of which regions is surrounded by a dotted line corresponds to a display area 31 of a display for output.

In the odd line data 2*a* shown in (*a*) of FIG. 1, an ellipse 4 indicates pixel data for each one pixel made of sub-pixels of RGB. A scaling ratio used in an example of the present resolution conversion is a ratio of the resolution (720 pixels) of the input image data 1 to the resolution (320 pixels) of the delta arrangement image data 2. Accordingly, the scaling ratio is 2.25. Therefore, a length of data for one pixel in the odd line data 2*a* corresponds to 2.25 divisions on the scale 10.

Similarly, in the even line data 2*b* shown in (*b*) of FIG. 1, an ellipse 6 indicates pixel data for each one pixel made of sub-pixels of RGB. As described above, the scaling ratio is 2.25. Therefore, a length of data for one pixel in the even line data 2*b* corresponds to 2.25 divisions on the scale 10.

(Initial Value)

The present resolution conversion is based on linear interpolation. An image data conversion formula used in the liner interpolation requires a predetermined initial value. Regarding an initial value used in the present resolution conversion, the initial value used for conversion into the odd line data 2*a* in (*a*) of FIG. 1 is set to half a scaling ratio 2.25. As described above, each pixel data of the delta arrangement image data 2 corresponds to 2.25 divisions on the scale 10. Accordingly, as shown in (*b*) of FIG. 1, in a case where an initial value used in conversion into the even line data 2*b* is set to be 0, a position of a pixel to be referred to next is at 2.25 dots. Here, in the present embodiment, the initial value used for conversion into the odd line data 2*a* is 1.125 that is half a value of 2.25 so that the initial value corresponds to a shift of 0.5 dot between the odd line data 2*a* and the even line data 2*b*.

As described above, in the present embodiment, the initial value of the odd line is set to a value that is half the initial value of the even line. In other words, the initial value of the even line is twice the initial value of the odd line. However, the initial value is not limited to this, but may be any value as long as the initial value of the odd line is in a range of $(1\pm\alpha)/2$ $(0\leq\alpha\leq0.5)$ of the initial value for the even line. If the initial line for the odd line is over this range, a dot adjacent to a dot (R, G, or B) to be processed is selected from data used for interpolation. This causes a problem.

(Conversion of Odd Line)

First, the conversion into the odd line data 2*a* is explained with reference to (*a*) of FIG. 1.

As shown in (*a*) of FIG. 1, in the conversion into the odd line data 2*a*, the initial value 1.125 as described above is used. For example, in a case where an R pixel value is converted, a pixel value of r0 of a first pixel provided at a starting position of the odd line data 2*a* is obtained as follows. Because the initial value used in this case is 1.125, an R pixel corresponding to the initial value in the input image data 1 is a pixel R1. As an arrow 5 indicates, with reference to pixel values of R1 and R2 that is disposed adjacent to R1 on a right side of R1, conversion into r0 is performed. More specifically, a value of r0 is obtained by substituting the pixel values of R1 and R2 into an expression: $r0=R1\times(1-0.125)+R2\times0.125$.

Then, a pixel value of r1 of a second pixel in the odd line data 2*a* is obtained as follows. Because the scaling ratio is 2.25 as described above, a next R pixel to be referred to in the input image data 1 is a pixel corresponding to a position of a value obtained by adding 2.25 to 1.125 dots. That is, as indicated by an arrow 5, with reference to a pixel R3 corresponding to a position 3.375 dots on the scale 10 and R4 positioned adjacent to R3 on the right side of the pixel R3, conversion into r1 in the odd line data 2*a* is performed. In other words, r1 is obtained from an expression $r1=R3\times(1-0.375)+R4\times0.375$.

Each pixel value is obtained according to the method described above until a value of the last R pixel in the odd line data 2*a*, that is, r319 is obtained. The same applies to calculation of pixel values of g and b constituting each one pixel of the odd line data 2*a*.

(Conversion of Even Line)

Next, the conversion into the even line data 2*b* is explained with reference to (*b*) of FIG. 1. Basically, a method for the conversion into the even line data 2*b* is the same as that into the odd line data 2*a* as described above.

For example, in a case where an R pixel value is converted, a pixel value of r1 of a first pixel provided at a starting position of the even line data 2*b* is obtained as follows. Because the initial value used in this case is 0, an R pixel corresponding to the initial value in the input image data 1 is a pixel R0. However, as shown in (*b*) of FIG. 1, the pixel r0 corresponding to R0 in the even data 2*b* after conversion is not within a display area 31. Therefore, data of R1 is discarded here.

For the pixel at a starting position of the even line data 2*b*, the input image data 1 corresponding to g and b is converted. A pixel value of g0 is obtained as follows. The initial value used in this case is 0. Accordingly, a G pixel corresponding to the initial value in the input image data 1 is G0. As indicated by an arrow 7, with reference to the pixel R0 corresponding to the position of 0 on the scale 10, conversion into g0 of the odd line data 2*b* is performed. Here, the position to be referred to is at 0.00 and does not have a fractional figure after the decimal point, the conversion is carried out by referring to only a pixel value of G0 in this case. That is, g0 is obtained from an expression g0=G0.

Then, the pixel value of g1 of the second pixel in the even data line 2*b* is obtained as follows. Because the scaling ratio is 2.25 as described above, a next pixel G to be referred to in the input image data 1 is a pixel corresponding to a position of a value obtained by adding 2.25 to 0. That is, as indicated by an arrow 7, with reference to a pixel G2 corresponding to a position of 2.25 dots on the scale 10 and G3 positioned adjacent to G2 on the right side of the pixel G2, conversion into g1 is performed. More specifically, a value of g1 is obtained by substituting pixel values of G2 and G3 into an expression g1=G2×(1−0.25)+G3×0.25.

Each pixel value is obtained according to the method described above until a value of the last G pixel in the even line data 2*b*, that is, g319 is obtained. The same applies to calculation of pixel values of r and b constituting one pixel of the even line data 2*b*. In this way, the image data converting section 24 converts the input image data 1 whose pixels are in a stripe arrangement and whose resolution is 720 pixels into the delta arrangement image data 2 whose pixels are in a delta arrangement and whose resolution is 320 pixels.

Figure 4:
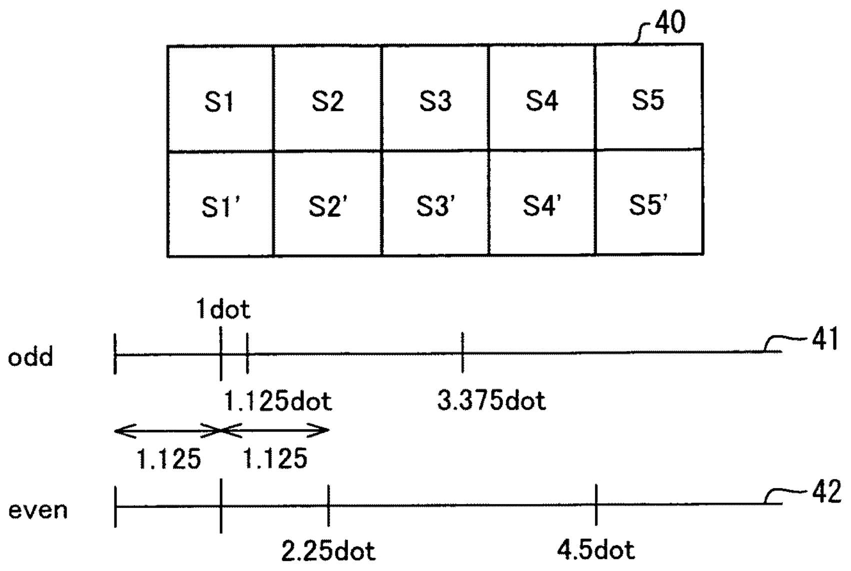
FIG. 4
Figure 5:
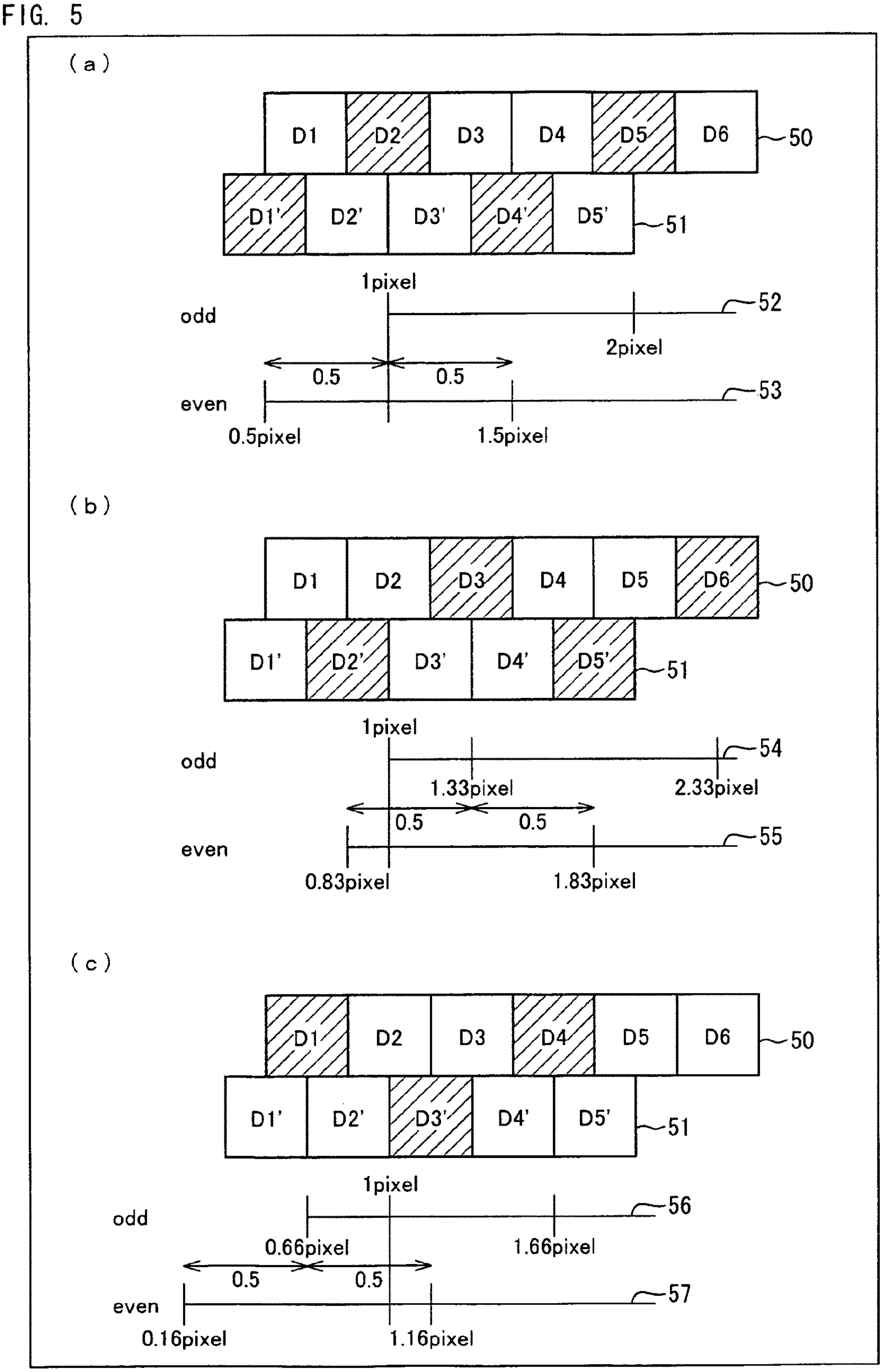
FIG. 5

Next, with reference to FIGS. 4 and 5, the following explains in more detail an arrangement of pixels of image data that is to be converted by the image data converting section 24 as described above with reference to FIG. 1. First, with reference to FIG. 4, the following explains downsampling.

(Downsampling)

FIG. 4 is a diagram illustrating sampling positions in odd line data and even line data in downsampling in a stripe arrangement, in a case where image data whose resolution is 720 pixels in a stripe arrangement is converted into image data whose resolution is 320 pixels in a delta arrangement. Here, a scaling ratio is 2.25 as described above.

As shown in FIG. 4, in stripe arrangement image data 40, pixels S1 to S5 are aligned in the first line (hereinafter, referred to as odd data) and pixels S1' to S5' are aligned in the second line (hereinafter, referred to as even data). The first line data corresponds to the odd line data 2*a* described above and the second line data corresponds to the even line data 2*b* described above. Scales 41 and 42 shown below the stripe arrangement image data 100 correspond to the first line data and the second line data, respectively. The scales 41 and 42 have numerical values each indicating a starting position of sampling of pixel data in each line.

As shown in the scale 41, an initial value used in sampling of the odd data, that is, the first sampling position is arranged to be 1.125 dots. Meanwhile, the initial value used in sampling of the even data is set to 0 dot.

A pixel arrangement after the resolution conversion becomes a delta arrangement in which odd data and even data are provided alternately in a vertical direction. Regarding pixel units, pixels in the even data are disposed so as to be shifted by 0.5 pixel to the left from the pixels in the odd data, respectively. In this case, the second sampling position of the even data is 2.25 dots obtained by adding the scaling ratio 2.25 to the initial value 0. Accordingly, in consideration of a shift of 0.5 pixel (½ pixel) in an output, a position of 1.125 dots that is half a sampling position 2.25 of the even data is arranged to be the first sampling position of the odd data. Each of the sampling positions and the initial values corresponds to a numerical value on the scale 10 in the schematic diagram illustrating the image data conversion explained with reference to FIG. 1.

On the scale 41, 3.375 dots is indicated. The "3.375 dot" is a position of the next sampling which position is obtained by adding the scaling ratio 2.25 to the initial value 1.125 dots in the odd data.

Meanwhile, on the scale 42, 4.5 dots is indicated. The "4.5 dots" is a position of the next sampling which position is obtained by adding 2.25 to a sampling value 2.25 in the even data.

According to the above sampling position, a starting position of the first sampling data in the odd data is 1.125 dots. Meanwhile, a starting position of the first sampling data in the even data is 0. Further, a starting position of the second sampling data in the odd data is 3.375 dots. Meanwhile, a starting position of the second sampling data in the even data is 2.25 dots.

Accordingly, with respect to the staring position of the first sampling data in the odd data as a reference, the starting position of the first sampling data in the even data is shifted by 1.125 dots to the left and the starting position of the second sampling data in the even data is shifted by 1.125 dots to the right.

(Image Data after Conversion)

Next, the following explains an overview of image data after the resolution conversion, with reference to FIG. 5. FIG. 5 is a diagram showing respective positions of RGB pixels in a delta arrangement after conversion of the image data whose resolution is 720 pixels in a stripe arrangement into the image data whose resolution is 320 pixels in the delta arrangement. (*a*) of FIG. 5 shows a position of G pixel data in the delta arrangement; (*b*) of FIG. 5 shows a position of B pixel data in the delta arrangement; and (*c*) of FIG. 5 shows a position of R pixel data in the delta arrangement.

As shown in (*a*) of FIG. 5, in odd data 50, the first G data is D2, and the second G data is D5. Meanwhile, in even data 51, the first G data is D1' and the second G data is D4'. Scales 52 and 53 correspond to the odd data 50 and the even data 51, respectively. Each numerical value on the scales 52 and 53 indicates a center position of each pixel data in the odd data 50 or the even data 51. Here, with respect to D2 of the odd data 50 as a reference, D1' of the even data 51 is shifted by 0.5 pixel to the left and D4' is shifted by 0.5 pixel to the right.

With reference to (*b*) of FIG. 5, in the odd data 50, the first B data is D3 and the second B data is D6. Meanwhile, in the even data 51, the first B data is D2' and the second B data is D5'. Scales 54 and 55 correspond to the odd data 50 and the even data 51, respectively. Each numerical value on the scales 54 and 55 indicates a center position of each pixel data in the odd data 50 or the even data 51. Here, with respect to D3 of the odd data 50 as a reference, D2' of the even data 51 is shifted by 0.5 pixel to the left and D5' is shifted by 0.5 pixel to the right.

Further, With reference to (*c*) of FIG. 5, in the odd data 50, the first R data is D1 and the second R data is D4. Meanwhile, in the even data 51, the first R data is D0' (not shown) that is disposed adjacent to D1' on the left side of D1' and the second R data is D3'. Scales 56 and 57 correspond to the odd data 50 and the even data 51, respectively. Each numerical value on the scales 56 and 57 indicates a center position of each pixel data in the odd data 50 or the even data 51. Here, with respect to D1 of the odd data 50 as a reference, D0' of the even data 51 is shifted by 0.5 pixel to the left and D6' is shifted by 0.5 pixel to the right.

(Effects of Resolution Conversion by Linear Interpolation)

As described above, in each of R, G and B pixel data after the resolution conversion, a shift amount between reference pixel data in the odd data 50 and a pixel in the even data 51 corresponding to the reference pixel data is equal to a shift amount between the reference pixel data in the odd data 50 and another pixel in the even data 51 which another pixel is a succeeding pixel of the pixel data in the even data 51 corresponding to the reference pixel data. In this way, the image data converting section 24 can perform resolution conversion so that a relative positional relation of respective pixel data in converted image data becomes the same as a relative positional relation of respective pixel data in the input image data. Therefore, the image converting device of the present invention can reduce or avoid misalignment of pixel data which has conventionally been a problem.

Figure 6:
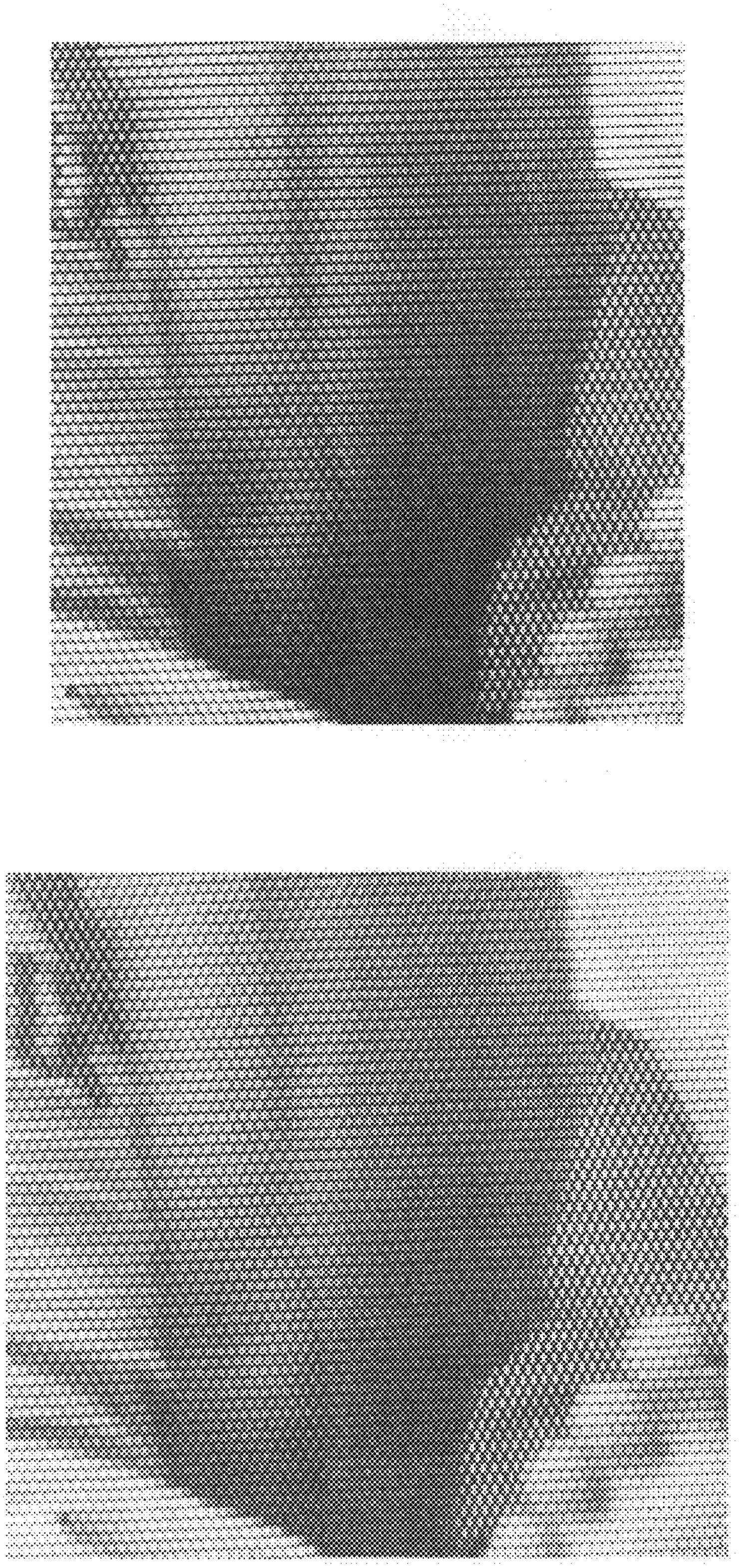
FIG. 6
Figure 7:
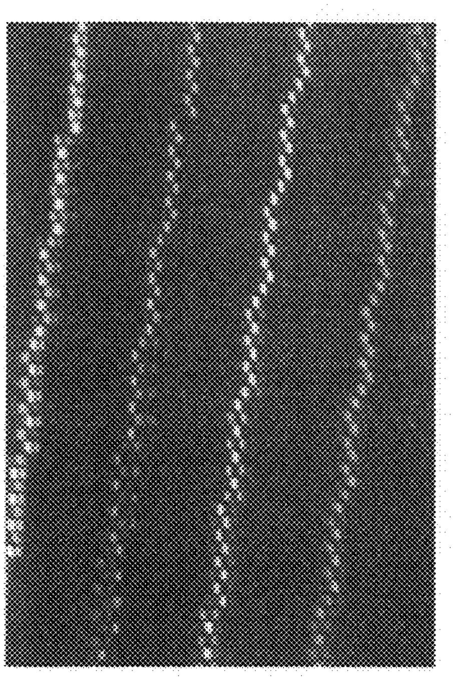
FIG. 7
Figure 7:
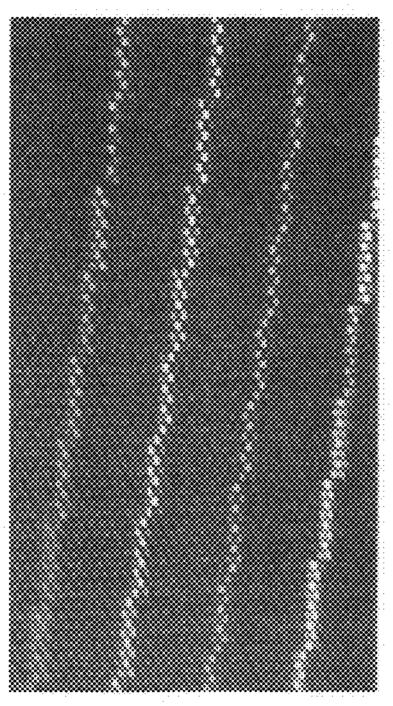
Figure 8:
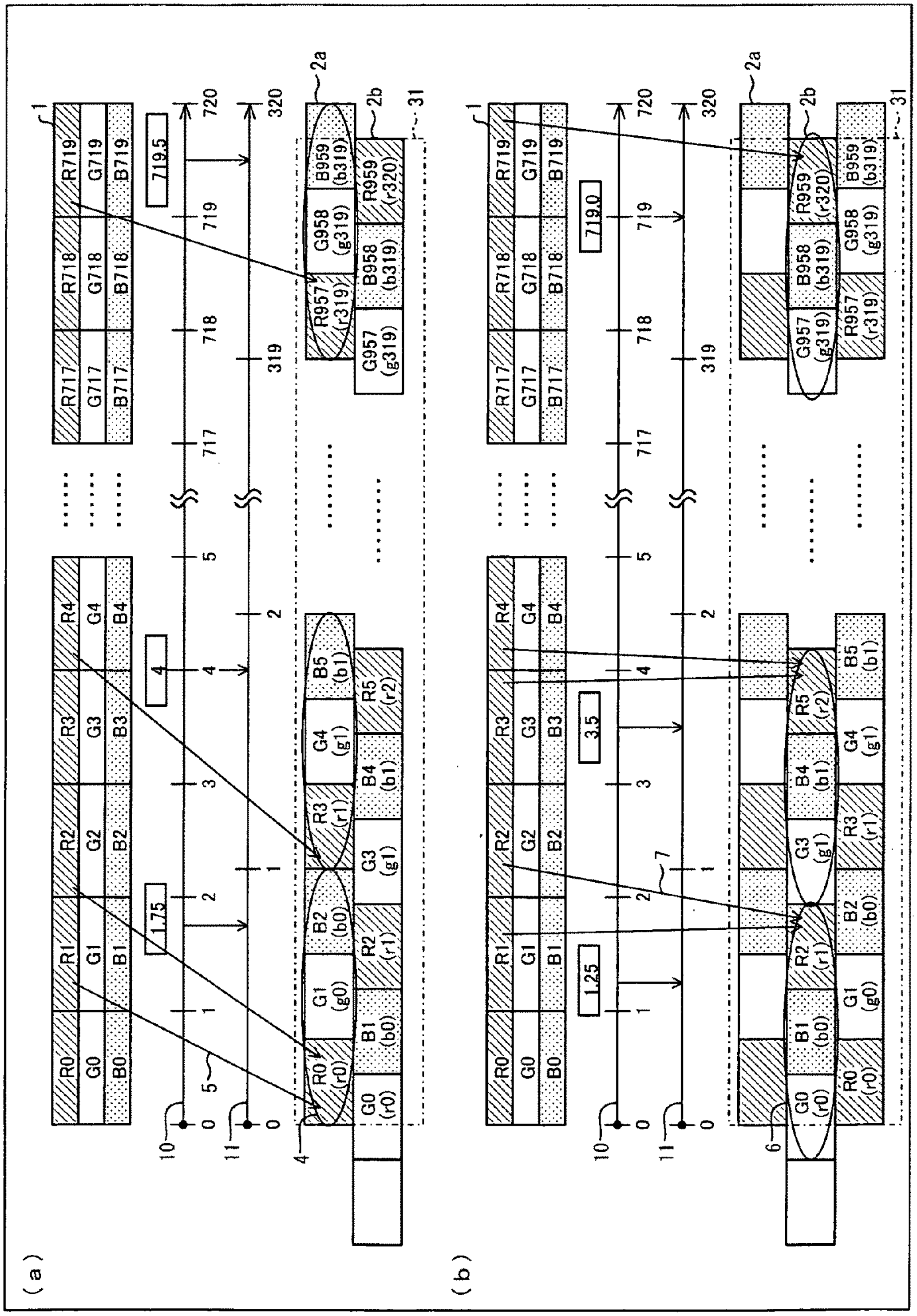
FIG. 8
Figure 9:
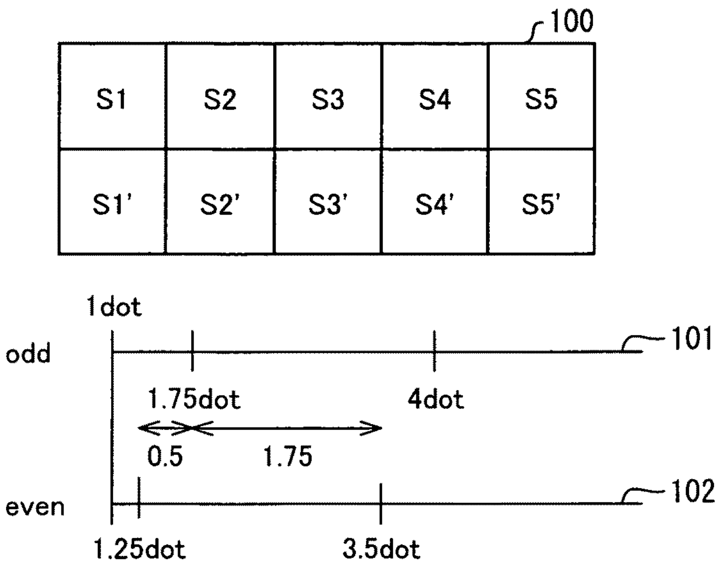
FIG. 9
Figure 10:
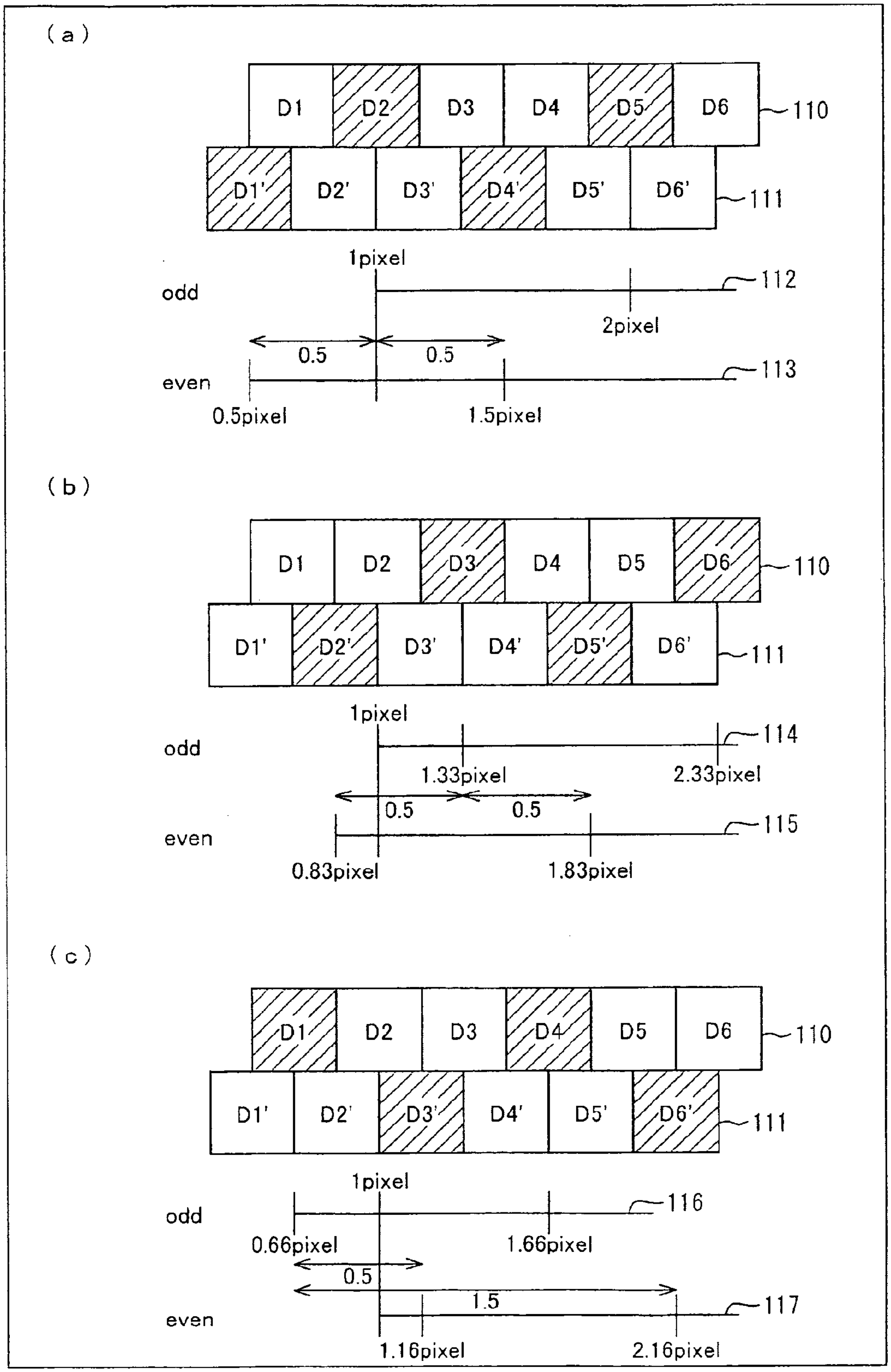
FIG. 10

Here, the following explains in more detail the effects of resolution conversion of the present invention, with reference to FIGS. 6 and 7. FIG. 6 is a diagram illustrating (i) image data obtained as a result of converting image data by a conventional resolution conversion function and (ii) image data obtained as a result of converting, by the image data converting section 24 of the present invention, image data that is the same as the image data converted by the conventional resolution conversion function. (*a*) of FIG. 6 shows an image that is obtained by conversion by the resolution conversion function provided in a conventional liquid crystal driver. As shown in (*a*) of FIG. 6, a contour section is clearly observed to be jaggy. Further, a fine red dots (coloring) can be observed. On the other hand, (*b*) of FIG. 6 shows an image obtained by conversion by the image data converting section 24 of the present invention. As shown in (*b*) of FIG. 6, the jaggy appearance of the contour section is suppressed. Further, no coloring occurs.

FIG. 7 is a diagram showing (i) image data obtained as a result of converting image data by a conventional resolution conversion function and (ii) image data obtained as a result of converting, by the image data converting section 24 of the present invention, image data that is the same as the image data converted by the conventional resolution conversion function. (*a*) of FIG. 6 shows an image that is obtained by conversion by the resolution conversion function provided in a conventional liquid crystal driver. As shown in (*a*) of FIG. 7, oblique lines (particularly, second line from the left side) are not smoothly displayed. On the other hand, (*b*) of FIG. 7 shows an image obtained by conversion by the image data converting section 24 of the present invention.

As shown in FIGS. 6 and 7, all oblique lines are smoothly displayed.

In this way, the image data converting section 24 of the present invention carries out conversion into an image that looks natural and that shows smooth lines by suppressing a jaggy and/or colored appearance of the image contour section. This makes it possible to significantly improve image quality.

Note that the present invention is not limited to the above embodiment. A person skilled in the art can modify the present invention in various ways within the scope recited in the claims. That is, within the scope of the claims, another new embodiment is obtained in combination with technical means modified as appropriate.

INDUSTRIAL APPLICABILITY

The present invention is widely applicable as an image data converting device for carrying out conversion into delta arrangement image data. For example, the present invention can be realized as a resolution converting device provided in a liquid crystal driver for a DSC.

Reference Signs List

| | |
|---|---|
| 1 | Input Image Data |
| 2 | Delta Arrangement Image Data |
| 2a | Odd Line Data |
| 2b | Even Line Data |
| 4, 6 | Ellipse |
| 5, 7 | Arrow |
| 10, 11, 41, 42, 52 to 57, 101, 102, 112-117 | Scale |
| 20 | Liquid Crystal Driver |
| 21 | UV Interpolating Section |
| 22 | LPF |
| 23 | RGB Converting Section |
| 24 | Image Data Converting Section (Image Data Converting Device, Odd Line Pixel Value Converting Section, Even Line Pixel Value Converting Section) |
| 30 | Delta Arrangement Panel |
| 31 | Display Area |
| 40 | Stripe Arrangement Image Data |
| 50 | Odd Data |
| 51 | Even Data |
| 70, 71 | Dotted Line |
| 80 | Triangle |
| 81 | Arrow |

The invention claimed is:

1. A method for converting image data, the method converting, by linear interpolation, input image data having a predetermined resolution into delta arrangement image data having a resolution that is smaller than the predetermined resolution, the method comprising the steps of:

converting a value of each pixel in each even line in the input image data into a value of each pixel in each even line in the delta arrangement image data, by using a predetermined initial value for even lines; and converting a value of each pixel in each odd line in the input image data into a value of each pixel in each odd line in the delta arrangement image data, by using a predetermined initial value for odd lines, the predetermined initial value for odd lines being $(1\pm\alpha)/2$ $(0\leq\alpha\leq0.5)$ of the initial value for the even lines.

* * * * *